(12) United States Patent
Estevez et al.

(10) Patent No.: US 7,352,916 B2
(45) Date of Patent: Apr. 1, 2008

(54) METHOD OF CODING ARTIFACTS REDUCTION

(75) Inventors: Miguel Estevez, Griesheim (DE); Christian Unruh, Stuttgart (DE); Peter Wagner, Waiblingen (DE)

(73) Assignee: Sony Deutschland GmbH, Cologne (DE)

( * ) Notice: Subject to any disclaimer, the term of this patent is extended or adjusted under 35 U.S.C. 154(b) by 0 days.

(21) Appl. No.: 11/202,612

(22) Filed: Aug. 11, 2005

(65) Prior Publication Data

US 2005/0265623 A1    Dec. 1, 2005

(51) Int. Cl.
*G06K 9/40* (2006.01)

(52) U.S. Cl. .................... 382/275; 382/233; 382/235; 382/252; 358/3.26; 358/3.27; 358/463

(58) Field of Classification Search ............... 382/260, 382/274, 275, 261, 233, 235, 244, 252; 358/3.26, 358/3.27, 463
See application file for complete search history.

(56) References Cited

U.S. PATENT DOCUMENTS

| | | | | |
|---|---|---|---|---|
| 35,414 | A | 5/1862 | Muralami et al. ........ 348/416 |
| 5,228,098 | A * | 7/1993 | Crinon et al. ............ 382/240 |
| 5,367,629 | A | 11/1994 | Chu et al. ................ 382/253 |
| 5,442,407 | A * | 8/1995 | Iu ............................. 348/620 |
| 5,502,489 | A * | 3/1996 | Kim et al. ................ 348/607 |
| 5,764,307 | A | 6/1998 | Ozcelik et al. ........... 348/608 |
| 5,832,134 | A * | 11/1998 | Avinash et al. .......... 382/257 |
| 5,920,356 | A | 7/1999 | Gupta et al. ............. 348/606 |
| 6,005,626 | A * | 12/1999 | Ding ....................... 375/240.16 |
| 6,178,205 | B1 | 1/2001 | Cheung et al. .......... 375/240.29 |
| 6,281,842 | B1 * | 8/2001 | Moren .................... 343/700 MS |
| 6,281,942 | B1 * | 8/2001 | Wang ....................... 348/607 |
| 6,310,982 | B1 * | 10/2001 | Allred et al. ............ 382/260 |
| 6,335,990 | B1 * | 1/2002 | Chen et al. .............. 382/261 |
| 6,400,989 | B1 * | 6/2002 | Eckmiller ................ 607/54 |
| 6,466,625 | B1 | 10/2002 | Kobayashi et al. ...... 375/240.29 |
| 6,668,097 | B1 * | 12/2003 | Hu et al. .................. 382/275 |

(Continued)

FOREIGN PATENT DOCUMENTS

EP    0 878 776    11/1998

(Continued)

OTHER PUBLICATIONS

Park H W, et al.: "A Postprocessing Method for Reducing Quantization Effects in Low Bit-Rate Moving Picture Coding" IEEE Transactions on Circuits and Systems for Video Technology, US, IEEE Inc. New York, vol. 9, No. 1, Feb. 1999, pp. 161-171, XP000802295.

(Continued)

*Primary Examiner*—Bhavesh M Mehta
(74) *Attorney, Agent, or Firm*—Oblon, Spivak, McClelland, Maier & Neustadt, P.C.

(57) ABSTRACT

A method to reduce coding artifacts within a discrete decoded picture includes a spatial and/or temporal filtering with respective filter characteristics dependent on an image quality value (Q). Preferably, the spatial filtering includes a deblocking filtering, wherein the deblocking filter operation decreases with an increasing image quality value (Q) and/or the deblocking filtering chooses an image quality value (Q) dependent weighting function for a pixel to be filtered according to an activity of both blocks to which common border said pixel belongs.

6 Claims, 5 Drawing Sheets

U.S. PATENT DOCUMENTS

| | | | |
|---|---|---|---|
| 6,788,823 B2 * | 9/2004 | Allred et al. | 382/260 |
| 6,919,892 B1 * | 7/2005 | Cheiky et al. | 345/473 |
| 6,965,724 B1 * | 11/2005 | Boccon-Gibod et al. | 386/68 |
| 7,027,661 B2 * | 4/2006 | Estevez et al. | 382/275 |

FOREIGN PATENT DOCUMENTS

| | | |
|---|---|---|
| FR | 2 758 198 | 7/1998 |
| GB | 2 322 252 | 8/1998 |

OTHER PUBLICATIONS

Teo P C, et al.: "Perceptual Image Distortion" Proceedings of the International Conference on Image Processing, US, Los Alamitos, IEEE Comp. Soc. Press, vol. CONF. 1, Nov. 13, 1994, pp. 982-986, XP000522762.

* cited by examiner

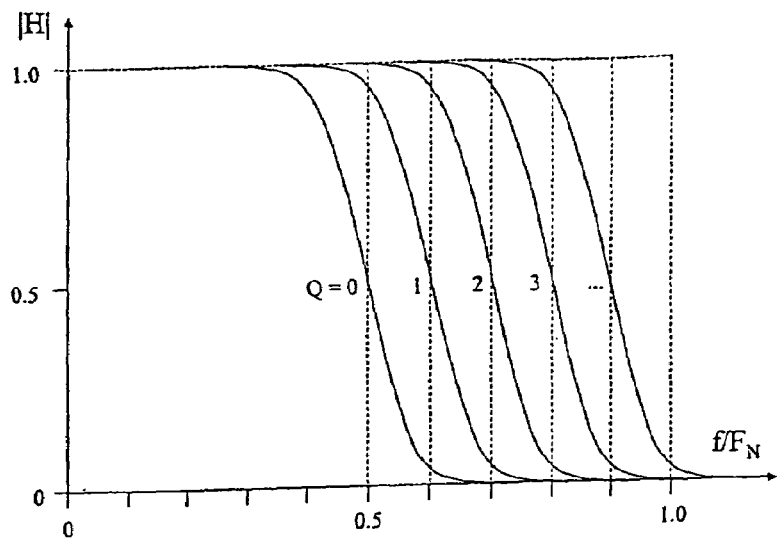
Fig. 4
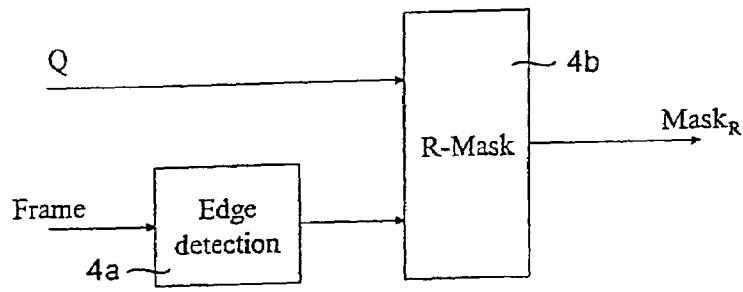
Fig. 5
for $QA_{min}$, $QA_{low}$ and $QA_{high}$     for $QA_{max}$
Filter = $\begin{array}{|c|c|c|}\hline 1 & 2 & 1 \\\hline 2 & W & 2 \\\hline 1 & 2 & 1 \\\hline\end{array}$     Filter = $\begin{array}{|c|c|c|}\hline 0 & 0 & 0 \\\hline 0 & 1 & 0 \\\hline 0 & 0 & 0 \\\hline\end{array}$
$W = \begin{cases} 4 & ; \text{for } QA_{min} \\ 8 & ; \text{for } QA_{low} \\ 16 & ; \text{for } QA_{high} \end{cases}$
Fig. 6

METHOD OF CODING ARTIFACTS REDUCTION

BACKGROUND OF THE INVENTION

1. Field of the Invention

The present invention is generally related to a method of coding arefacts reduction, in particular of a discrete decoded picture.

Generally, picture coding/compression standards like JPEG or MPEG are based on block-based discrete cosine transformation (DCT) encoding. Therefore, a loss of quality might arise within an encoded image, such as blocking or ringing artefacts.

2. Description of Related Art

Different methods are proposed to reduce such a loss of quality, like from H. W. Park, Y. L Lee "A Postprocessing Method For Reducing Quantization Effects And Low Bit-Rate Moving Picture Coding", IEEE Transactions on Circuit Systems For Video Technology, Vol. 9, No. 1, February 1999, pages 161-171, and by S. Minami, A. Zakhor "An Optimization Approach for Removing Blocking Effects in Tranform Coding", IEEE Transactions on Circuits and Systems for Video Technology, Vol 5, No. 2, April 1995, pages 74 to 82.

In particular, according to the first mentioned described postprocessing method blocking artefacts are reduced by one-dimensional horizontal and vertical lowpass filtering and the ringing noise is reduced by two-dimensional signal-adaptive filtering. Since such restoration techniques for removing blocking effects are described to result in unnecessary blurring of the image in the latter mentioned paper, a new approach is proposed therein which exploits the correlation between the intensy values of boundary pixels of two neighbouring blocks. This approach is based on the theoretical and empirical observation that under mild assumptions quantization of the DCT coefficients of two neighbouring blocks increases the expected value of the mean squared difference of slope (MSDS) between the slope across two adjacent blocks, and the average between the boundary slopes of each of the two blocks. Since the amount of this increase is dependent upon the width of quantization intervals of the transformed coefficients among all permissible inverse quantized coefficients the set of DCT coefficients which reduces the expected value of this MSDS by an appropriate amount is most likely to decrease the blocking effect.

U.S. Pat. No. 5,442,462 shows an apparatus and a method for smoothing images applicable for adaptive spatial noise reduction, adaptive temporal noise reduction and a combination thereof. It is described to use the teaching to cope with noise artifacts resulting from spatial and spatio-temporal image coding and compression methods such as block transform techniques. Further, iterated computation in presence of excessive noise is allowed. The adaptive smoothing technique determines a most suitable weighting for each processed pixel. Furthermore, also a manual input from a user is described to adapt the output image to the desires of the user. Finally it is described that the disclosed method performs the time domain smoothing after the spatial smoothing operation is performed.

WO 99/22509 describes an image data post-processing method for reducing quantization effect and an apparatus therefore. In the introductory part of the specification a spatio-temporal adaptive post-filtering is mentioned for low bit rate video signals. Further, according to the proposed method qualified semaphores are generated using the distribution of inverse quantization coefficients of inverse-quantized image data and a motion vector, whereafter the reducing of blocking artifacs is strongly or weakly performed depending on the generated blocking semaphore (similar for ringing). Although a temporal filtering is not directly described, the proposed method reduces the quantization effect adaptively by using spatial frequency and temporal information.

However, all of the above described methods inherit the disadvantage of a relatively high needed calculation power because of processing an entire image and in particular to determine a filtering characteristic in the aim to reduce coding artefacts based upon determination of an objective parameter influencing the respective filtering. Further, the image improvement is only noticable by encoding with a relatively low bit rate. That means that the improvement topples to degradation applying the method to encode sequences with high image quality.

Therefore, it is the object underlying the present invention to provide a further method to reduce coding artefacts within a discrete decoded picture which overcomes the above mentioned problems of the prior art methods.

SUMMARY OF THE INVENTION

The method to reduce coding artefacts within a discrete decoded picture according to the present invention is characterized by a spatial and/or temporal filtering with respective filter characteristics dependent on an image quality value.

Preferably, the image quality value is the result of the combination of measurements in spatial domain with the quantization coarseness applied to the neighbourhood of the observed region and a statistical function that reproduces a subjective quality perception. The result of measurements in spatial domain is a value that is very close related to the investigated artefact or degradation. For example in case of blocking artefacts, the spatial measurement might be a value that reproduces the discontinuity at block borders (e.g. the mean squared difference of slope MSDS might be used). The function used to reproduce the subjective quality perception might be a picture quality rating function as described in the European Patent Application 00 121 123.4 of the same applicant which content is herewith included by reference into this specification.

Therewith, the present invention basically differs from the coding artefact reduction methods according to the prior art in that the respective filter characteristics are not dependent on a parameter rating the artefacts included within the picture as objective as possible based on only spatial measurements, but the present invention performs spatial and/or temporal filtering with respective filter characteristics dependent on a subjective biased quality value, namely an image quality value which is gained from an overall characteristic of the image to be filtered. As mentioned above, preferably, said image quality value is determined according to the applicant's European patent application "Quality Rating Function for a Discrete Decoded Picture" which shows a picture quality rating function calculated on basis of information included within the picture and aiming to rate the picture quality similar to a subjective rating.

Alternatively, the picture quality of MPEG encoded sequences can be derived roughly from only the $M_{Quant}$ quantization scaling factor values. A small $M_{Quant}$ value points to a fine quantization and a large one to a coarser quantization. A fine quantization means that the picture subjectively contains a low level of coding artefacts that increases with the coarser quantization. This behaviour is exploited in the method to reduce coding artefacts according to the present invention.

Alternatively or additionally to the using of coding information from the decoder to derive the image quality value, the spatial and/or temporal processing can also be controlled by a corresponding parameter set by the user.

In any case, according to the present invention artefacts are removed by improving the subjective picture quality and therefore keeping as much picture details as possible. This also leads to a decreased calculation power needed for the filtering and determination of the filter functions.

According to the present invention, preferably said spatial filtering includes a deblocking filtering wherein the deblocking filter operation decreases with an increasing image quality value. Therefore, according to the present invention a higher subjective image quality leads to a reduced deblocking filtering and therewith to a reduced calculation amount and results in a picture with as much picture details as possible. Since the derived image quality value is adapted to reflect the subjective image quality, the reduction of deblocking filtering does not lead to a picture which includes a high amount of visible blocking artefacts, although not all blocking artefacts might be optimally removed from an objective point of view.

To decrease the deblocking filter operation, preferably an activity-dependent weighting function for a pixel to be filtered is chosen according to the image quality value, wherein the activity of both blocks to which common borders said pixel belongs is considered. Therefore, the deblocking filtering according to the present invention is not only dependent on the image quality value, but also on an activity of two blocks to which common border said deblocking filtering is applied. Perferably, a member of a family of curves which are all dependent on the activity is chosen according to image quality value.

Further preferably, said weighting function is only applied to said pixel to be filtered if a blocking artefact is detected. This feature further reduces the calculation load of the processor performing the filtering, since the filtering itself needs a rather high calculation power whereas the determination of a blocking artefact is a relatively easy operation.

Still further preferably, said deblocking filtering is performed separately for horizontal and vertical borders of neighbouring blocks.

Alternatively or additionally to the deblocking filtering, the spatial filtering according to the present invention comprises a deringing filtering, wherein the deringing filter operation decreases with an increasing image quality value. Similar to the case of the deblocking filtering also for the deringing filtering according to the present invention the general rule applies that the higher the subjective picture quality the weaker the filtering operation is performed to keep as much picture details as possible and to reduce the computational load needed for the filtering operations.

Preferably, an image quality value-dependent deringing mask is chosen for a pixel to be filtered. Further preferably, said deringing mask is only applied to said pixel to be filtered if said pixel belongs to a homogenous area. Therefore, only areas which can comprise ringing at all are subjective to the deringing filtering, again to reduce the needed calculation power.

Further preferably, said deringing filtering is a two-dimensional filtering taking only neighbouring pixels of said pixel to be filtered into account which belong to the same region. In this case the quality value-dependent deringing mask is kept rather simple, since it is possible to weight the pixel to be filtered by a value dependent on the subjective image quality value and the neighbouring pixels with constant values. In case that the image quality value indicates a maximum image quality, a special deringing mask might be applied taking only the pixel to be filtered into account, e.g. by weighting the pixel to be filtered with one and all neighbouring pixels with zero, or such a deringing mask might be approximated with the setting of an appropriate image quality value-dependent weighting factor for the pixel to be filtered with given weighting factors for the neighbouring pixels.

Further, alternatively or additionally, the temporal filter operation according to the present invention decreases with an increasing image quality value. Therefore, similar to the case of the deblocking and deringing filtering according to the present invention as much picture details as possible are kept and as less calculation power as possible is required for the temporal filtering, since also the temporal filter operation is reduced with an increasing subjective image quality value. Similar to both other filtering operations according to the present invention, the objective necessary temporal filter operation which would be performed according to the prior art is not performed according to the present invention in case the image quality value which is determined under subjective considerations indicates that themporal filtering is not necessary.

Further preferably, the temporal filter operation is realized with a blending filter applied to an entire frame which determines a new frame as a weighted sum of a predicted frame and an actual frame, which weighting is dependent on said image quality value and a difference of the actual frame with the predicted frame. Further preferably, said predicted frame is determined on basis of a motion compensation of a previously determined frame. Therewith, progressive or interlaced mode is considered as well as the motion included in the picture to be filtered. Similar to the case of the deblocking and deringing filtering according to the present invention also the temporal filtering keeps as much picture details as possible, i.e. minimizes the required filter operations.

According to the method to reduce coding artefacts of the present invention the image quality value is preferably determined based on a quantization scaling factor used for encoding the picture. Since a small quantization scaling factor value points to a fine quantization and a large one to a coarser quantization it is observed that the subjective image quality corresponds to the used quantization scaling factor. Further, the quantization scaling factor can easily be derived during decoding of the picture so that no additional information resulting from encoding of the picture is necessary.

Alternatively or additionally, said image quality value can also be determined based on a user selection. In this case the user can e.g. adapt the filtering to a current reception quality of a tuner device while watching a received movie directly according to his/her judgement of the image quality.

Further alternatively or additionally, the image quality value might be derived as disclosed in the applicant's parallel application "Quality Rating Function for a Discrete Decoded Picture".

Therewith, in any case the reducing of coding artefacts according to the present invention is dependent on an at least approximated subjective overall impression of the picure.

According to the present invention said discrete encoding/decoding of the picture is based on a discrete cosine transformation and further preferably on a MPEG coding scheme.

Therefore, the present invention exploits the behaviour that a high subjective image quality value indicates a low level of coding artefacts and a low subjective image quality value indicates a high level of coding artefacts. Therefore, the subjective image quality value is used to choose a filter from a set of filters with several characteristics. The chosen filter is applied in the relevant regions for the type of artefacts, e.g. at block borders to process in case of blocking, or inside the block to process ringing, or at every pixel position between two pictures in case of temporal filtering. The method according to the present invention enables to pass frames without filtering that have been encoded with high quality and to smooth frames that have been encoded with poor quality. The degree of smoothing is controlled by the image quality value.

Further, additional blurring is preferably avoided, since the image content is analyzed and areas with and without artefacts are separated. Therefore, in case of blocking the mean value and the acitivity of the block is preferably analyzed, in case of ringing an edge detection might be performed and at least motion compensation is advantageously used for temporal filtering.

Still further, according to the present invention a quantization scaling factor which can be derived from the decoded image sequence might be used to reflect the subjective image quality value, since a small quantization factor value points to a fine quantization and a large one to a coarser quantization, wherein a fine quantization means that the picture contains a low level of coding artefacts that increases with coarser quantization. In case that no quantization scaling factor values are available or additionally thereto the image quality value can be manually set by the viewer.

BRIEF DESCRIPTION OF THE DRAWINGS

Further features and advantages of the present invention are elucidated by the following description of a preferred embodiment thereof taken in conjunction with the accompanying drawings, wherein

FIG. 4 shows examples for filter characteristics for a one-dimensional deblocking filtering;

FIG. 5 shows the preparation of a mask to apply deringing filtering;

FIG. 6 shows an example of two-dimensional deringing filters;

DETAILED DESCRIPTION OF THE INVENTION

Figure 1:
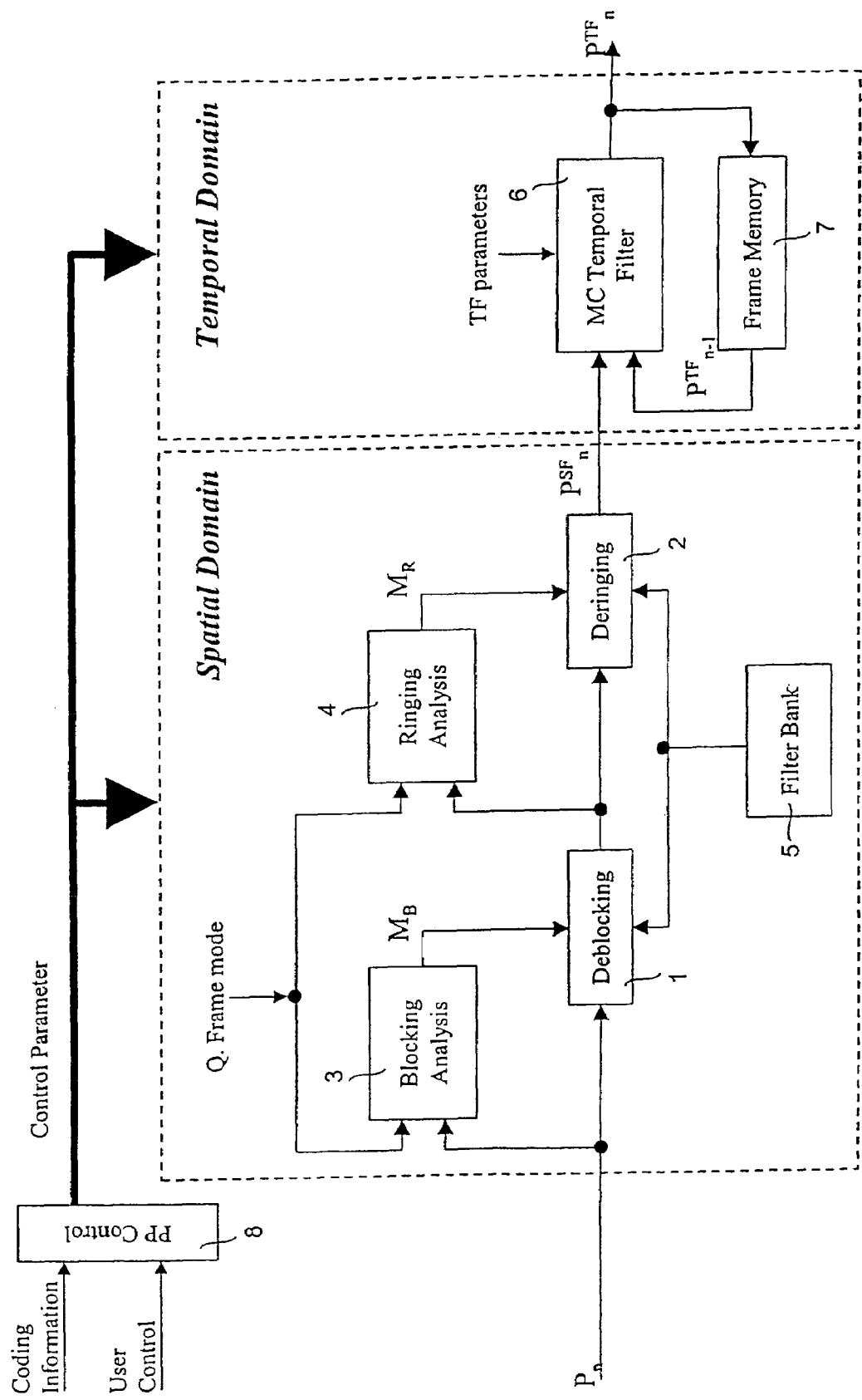
FIG. 1 shows an example of a system according to the present invention to reduce coding artefacts.

FIG. 1 shows a preferred embodiment of a system to reduce coding artefacts in conformity with the method to reduce coding artefacts within a discrete decoded picture according to the present invention. An incoming picture signal $P_n$ first undergoes a deblocking filtering 1 with a following deringing filtering 2 in the spatial domain before it is filtered in the temporal domain by a motion compensation temporal filter 6 which outputs the coding artefacts reduced picture signal $pTF_n$. The deblocking filter 1 and the deringing filter 2 have both access to a filter bank 5 to perform the respective necessary filter operations. To decide which parts of the picture will be subjected to the deblocking filtering 1 and the deringing filtering 2 a respective analysis is performed as described above. Therefore, a blocking analysis block 3 receives the incoming picture signal $P_n$ to output a control signal $M_B$ for the deblocking filter 1 and a ringing analysis block 4 receives the output signal of the deblocking filter 1 to output a control signal $M_R$ for the deringing filter 2 which outputs the spatial filtered picture signal $pSF_n$ to the temporal domain. The blocking analysis block 3 and the ringing analysis block 4 respectively receive further control parameters, such as a Frame/Field mode and the image quality value Q. The Frame/Field mode parameter enables to apply the filtering operation based on a frame (progressive picture format) or field (interlaced picture format) mode, since e.g. a frame-based filter applied to a field (interlaced) sequence results in a blurring distortion in the moving regions.

These control parameters are adjusted by a postprocessing control module 8 which receives coding information e.g. by a not shown MPEG decoder and/or a user control, i.e. a picture quality value provided by the user. The postprocessing control module 8 also supplies control parameters to the temporal domain, namely the parameters to set the temporal filtering within the motion compensation temporal filter 6 which receives the spatial filtered picture signal $pSF_n$ and outputs the coding artefacts reduced discrete decoded picture signal $pTF_n$. To determine this coding artefacts reduced discrete decoded picture signal $pTF_n$ the motion compensation temporal filter 6 also receives the preceding coding artefacts reduced discrete decoded picture signal $pTF_{n-1}$, i.e. the preceding frame of this picture signal, which is obtained by delaying the preceding output signal of the motion compensation temporal filter 6 by one frame with a frame memory 7.

Figure 2:
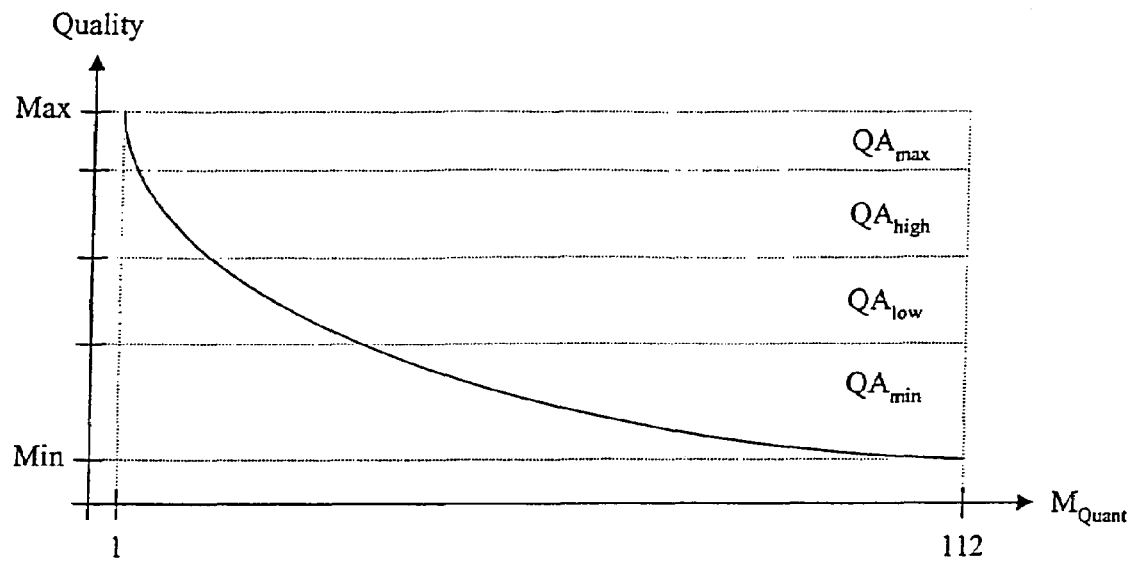
FIG. 2 shows the subjective image quality versus a quantization scaling factor value.

To perform the filter operations first an image quality value Q has to be determined. FIG. 2 shows a dependency of the quality value Q from the quantization scaling factor values $M_{Quant}$ for MPEG decoding. This curve can be expressed by an exponential function with an negative exponent which indicates a maximum image quality for a scaling factor $M_{Quant}=1$ and a minimum image quality for a scaling factor $M_{Quant}=112$. Of course, these values of the scaling factor which are adapted to MPEG coding and decoding represent only relative values. Further, as mentioned above, the image quality value Q is preferably derived according to the applicant's parallel European patent application "Quality Rating Function for a Discrete Decoded Picture".

In the following the deblocking filter operation is described in respect to FIGS. 3 and 4 before the deringing filter operation is described in respect to FIGS. 5 to 7 and the temporal filtering is described in respect to FIGS. 8 and 9.

Figure 3:
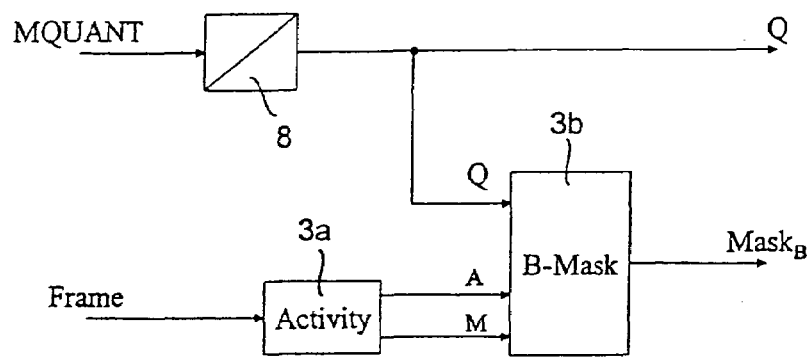
FIG. 3 shows the preparation of a mask to apply deblocking filtering.

FIG. 3 shows the preparation of a filter mask to apply the deblocking filtering, in particular a frame preprocessing block 3a and a blocking mask selection block 3b included within the blocking analysis block 3 shown in FIG. 1. The frame preprocessing block 3a receives an incoming frame, i.e. the incoming picture signal $P_n$, and measures the activity A within all discrete decoded blocks, i.e. 8×8 blocks in case of MPEG coding. The measurement results in regions with very low and regions with higher activity A. Further, the frame preprocessing block 3a calculates a mean value M of all these blocks. The activity A and the mean value M of all 8×8 blocks are supplied to the blocking mask selection block 3b which also receives the image quality value Q supplied by the postprocessing control module 8 which receives the quantization scaling factor value $M_{Quant}$. The blocking mask selection block 3b selects a filter function $F_B$ [Q] from the filter functions shown in FIG. 4 which are basically a family of lowpass filter functions with different cut-off frequencies so that for a higher image quality value Q a wider pass band is available. A good practical rule is to define the filter functions between half resolution (f/$F_N$=0,5) and passed through (no filtering). An acceptable performance is achieved with a set of 4 filter characteristics. The filter mask generation for vertical borders is basically performed according to the following decision:

If |M[m][n]−M[m−1][n]|>$T_M$ then vertical object border instead of blocking else If *A[m][n]*<$T_A$ and *A[m−1][n]*<$T_A$ then filter=$F_B[Q]$ otherwise filter=$F_B[Q+1]$ wherein [m] defines the horizontal index from the current block, [n] defines the vertical index from the current block, [m−1] defines the horizontal index from the left block of the current block, [n−1] defines the vertical index from the upper block of the current block, $T_M$ defines a threshold value to differentiate an object border from a synthetic border (blocking) based on the transition of mean values measured for two neighbour blocks, and $T_A$ defines a threshold value to choose the deblocking filter intensity based on the activity measurement for two neighbour blocks.

For horizontal borders the same procedures are applied as described above for vertical borders, however, with vertical indices. This means:

If |M[m][n]−M[m][n−1]|>$T_M$ then horizontal object border instead of blocking else If *A[m][n]*<$T_A$ and *A[m][n−1]*<$T_A$ then filter=$F_B[Q]$ otherwise filter=$F_B[Q+1]$ The filter mask for deblocking contains the information about the filter intensity coupled to the direction of filtering (horizontal/vertical blocking).

The deblocking filtering 1 shown in FIG. 1 is then performed for all pixels of the picture according to the filter mask.

FIG. 5 shows the preparation of a mask to apply the deringing filtering, namely an edge detection block 4a and a ringing mask selection block 4b included within the ringing analysis block 4 shown in FIG. 1. The edge detection block 4a receives an incoming frame, i.e. a frame output from the deblocking filter 1, to differentiate edges from homogenous areas. The result of this edge detection is supplied to the ringing mask selection block 4b which also receives the image quality value Q as used for the choosing of the blocking mask. The ringing mask selection block 4b then outputs a deringing mask $Mask_R$ according to which a filter is chosen.

FIG. 6 shows an example of two-dimensional filters to be chosen according to the output of the ringing mask selection block 4b. To apply the deringing filter the Quality range is divided in a practical number of quality areas, in this case e.g. 4 areas $QA_{min}$, $QA_{low}$, $QA_{high}$, $QA_{max}$, as shown in FIG. 2. For Q=$QA_{min}$, $QA_{low}$, $QA_{high}$ a filter mask is chosen which consists of 3×3 pixel weighting coefficients to be applied to the pixels around a pixel to be filtered and the pixel to be filtered itself. The pixel to be filtered itself is weighted with a value W which is dependent on Q, e.g.

$$W[Q] = \begin{cases} 4 & \text{for } QA_{min} \\ 8 & \text{for } QA_{low} \\ 16 & \text{for } QA_{high} \end{cases}$$

The pixels horizontally and vertically adjacent to the pixel to be filtered are weighted with the constant value 2 and the pixels diagonally adjacent to the pixel to be filtered are weighted with the constant value 1. For Q=$QA_{max}$ the pixel to be filtered is weighted with the constant value 1 and surrounding pixels are weighted with the constant value 0.

Figure 7:
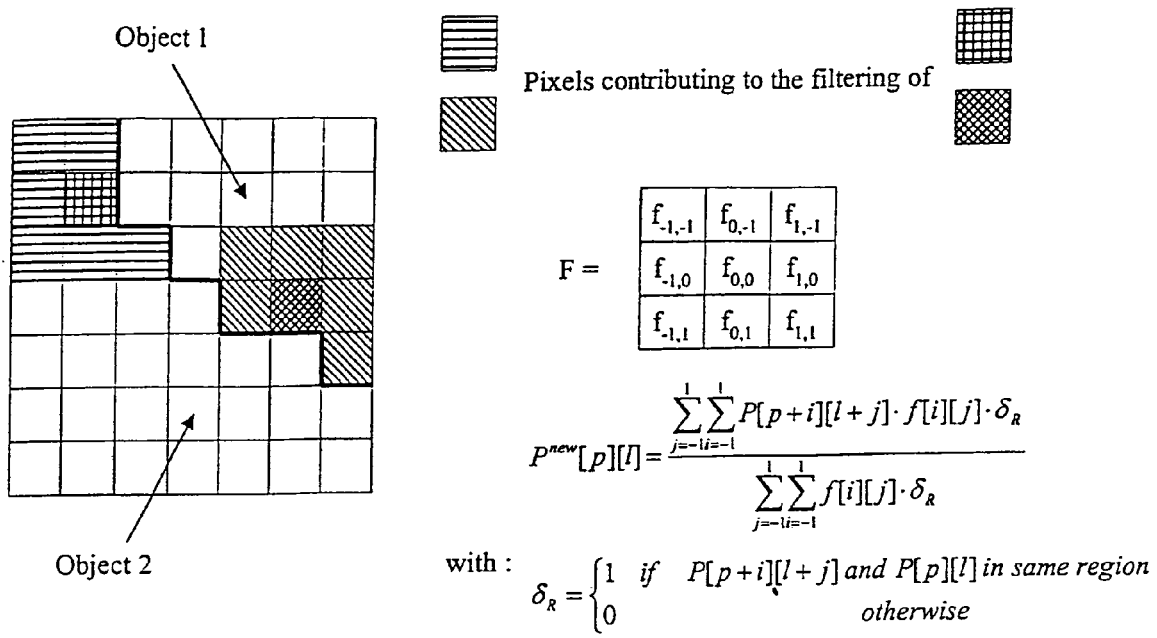
FIG. 7 elucidates the principles of the deringing filtering according to the present invention.

The so chosen filter mask is then applied according to the filtering operation elucidated in FIG. 7. In case the top left pixel of the 3×3 pixel block centered around the pixel to be filtered is labelled with $f_{-1,-1}$, the top pixel $f_{0,-1}$, the top right pixel is labelled with $f_{1,-1}$, the left pixel is labelled with $f_{-1,0}$, the pixel to be filtered, i.e. the center pixel is labelled with $f_{0,0}$, the right pixel is labelled with $f_{1,0}$, the bottom left pixel is labelled with $f_{-1,1}$, the bottom pixel with $f_{0,1}$, and the bottom right pixel with $f_{1,1}$. The following function determines the pixel value of the filtered pixel:

$$p^{new}[p][l] = \frac{\sum_{j=-1}^{1}\sum_{i=-1}^{1} P[p+i][l+j] \cdot f[i][j] \cdot \delta_R}{\sum_{j=-1}^{1}\sum_{i=-1}^{1} f[i][j] \cdot \delta_R}$$

with:

$$\delta_R = \begin{cases} 1 & \text{if } P[i][j] \text{ and } P[0][0] \text{ in same region} \\ 0 & \text{otherwise} \end{cases}$$

wherein [p] defines the absolute horizontal position in the picture of the processed pixel, [l] defines the absolute vertical position in the picture of the processed pixel, fit defines the horizontal offset to the neighbour pixel, e.g. i=−1 means left pixel position of current pixel, [j] defines the vertical offset to the neighbour pixel, e.g. j=−1 means upper pixel position of current pixel, P defines the pixel value, and f defines a filter coefficient.

Therefore, $\delta_R$ defines that only neighbour pixels are contributing to the filtering of a pixel which belong to the same region or object as the pixel to be filtered. This scenario is shown for two examples in FIG. 7 which shows a field of 7×7 pixels divided into two objects, namely a first object (Object 1) occupying 18 pixels in the upper right corner and a second object (Object 2) occupying ther rest of the field.

Figure 8:
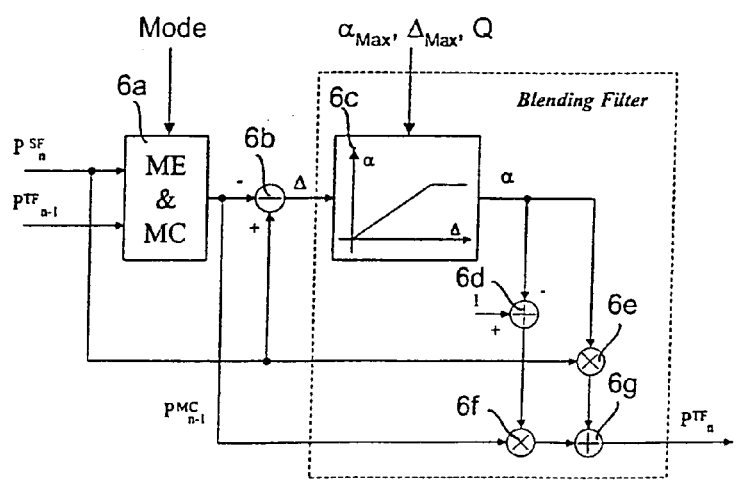
FIG. 8 shows an embodiment of the temporal filtering according to the present invention.

FIG. 8 shows the motion compensation temporal filter 6 in more detail. This motion compensation filter 6 basically comprises two units, namely a motion estimation & compensation block 6a and a blending filter which comprises a blending characteristic 6c, a first adder 6d, a first multiplier 6e, a second multiplier 6f and a third multiplier 6g. The motion estimation compensation block 6a receives the spatially filtered picture signal $p^{SF}_n$ from the deringing filter 2 and the previous coding artefacts reduced discrete decoded picture signal $p^{TF}_{n-1}$ from the frame memory 7. Based thereon, it performs a motion compensation to predict the actual frame from the previous one. Thereto, the motion estimation & compensation block 6a additionally receives a signal Mode indicating a motion estimation/motion compensation mode, i.e. a signal indicating a progressive or interlaced mode. The predicted frame is supplied as subtrahent to a third adder 6b which receives the actual frame $p^{SF}_n$ output from the deringing filter 2 as minuent to build the frame difference Δ between the actual and predicted frame. This frame difference Δ is input to select the belending filter characteristic which is also dependent on the image quality value Q.

Figure 9:
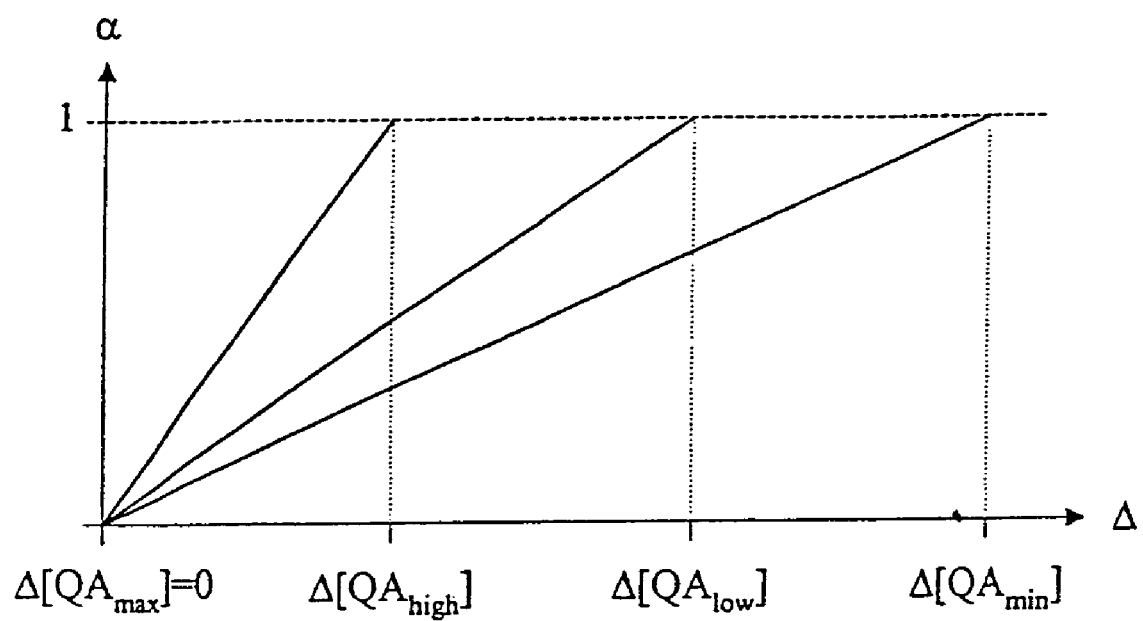
FIG. 9 shows an example for blending filter characteristics of a blending filter shown in FIG. 8.

FIG. 9 shows an example for blending filter characteristics according to which a blending parameter a is determined. Basically, according to the image quality value Q a value Δ[Q] is determined at which a equals to 1 and below which a linearly increases from α=0 at Δ=0 up to α=1 at Δ=Δ[Q], with the general rule that the higher the value Q the lower the value Δ[Q], i.e. the lower the picture quality the stronger the filtering.

The determined blending value α is supplied as subtrahent to a first adder 6d which receives the constant value 1 as minuent. The so calculated result 1−α is supplied to the second multiplier 6f which receives the predicted frame output from the motion estimation & motion compensation block 6a. Further, the blending value α is supplied to the first multiplier 6e which also receives the actual frame $P^{SF}_n$ output from the deringing filter 2 to output the product thereof to the second adder 6g which adds the product of 1−α and the predicted frame $P^{MC}_n$ output from the first multiplier 6f thereto to output the coding artefacts removed discrete decoded picture $P^{TF}_n$.

Of course, as is apparent from the foregoing description the order of deblocking, deringing and temporal filtering is not limited to the shown embodiment, but these filtering operations can have an arbitrary order. However, the order first spatial processing and then afterwards temporal processing is recommended, because ME (Motion Estimation) and MC (Motion Compensation) operations are sensible to any kind of noise. In this case, blocking as well as ringing noise will have influence in the performance of the temporal filtering. For this reason, if temporal filtering is implemented then it should operate after the spatial filtering to exploit the effect in a more optimal way. The order for the spatial processing modules (deblocking, deringing) is not restricted.

The invention claimed is:

1. A method to reduce coding artifacts within a discrete decoded picture, said method comprising the steps of:
spatial and/or temporal filtering with respective filter characteristics dependent on an image quality value;
wherein said image quality value is determined based on a user selection and wherein the temporal filter operation decreases with an increasing image quality value; and
wherein the temporal filter operation is realized with a blending filter applied to an entire frame which determines a new frame as a weighted sum of a predicted frame and an actual frame, which weighting is dependent on said image quality value and a difference of the actual frame with the predicted frame.

2. A method to reduce coding artifacts within a discrete decoded picture, said method comprising the steps of:
spatial and/or temporal filtering with respective filter characteristics dependent on an image quality value;
wherein said image quality value is determined based on a user selection;
wherein the temporal filter operation decreases with an increasing image quality value;
wherein the temporal filter operation is realized with a blending filter applied to an entire frame which determines a new frame as a weighted sum of a predicted frame and an actual frame, which weighting is dependent on said image quality value and a difference of the actual frame with the predicted frame, and
wherein said predicted frame is determined on basis of a motion compensation of a previously determined new frame.

3. A method to reduce coding artifacts within a discrete decoded picture, said method comprising the steps of:
spatial and/or temporal filtering with respective filter characteristics dependent on an image quality value,
wherein said image quality value is determined based on a user selection and wherein said spatial filtering includes a deblocking filtering, and
wherein the deblocking filter operation decreases with an increasing image quality value and
wherein the deblocking filtering chooses an activity-dependent weighting function for a pixel to be filtered according to a image quality value and
wherein the activity of both blocks to which a common border of said pixel belongs is considered.

4. A method to reduce coding artifacts within a discrete decoded picture, said method comprising the steps of:
spatial and/or temporal filtering with respective filter characteristics dependent on an image quality value,
wherein said spatial filtering includes a deringing filtering,
wherein said deringing filter operation decreases with an increasing image quality value and
wherein said deringing filtering chooses a deringing mask dependent on said image quality value, and
wherein said image quality value is determined based on a user selection.

5. A device for picture processing, comprising:
spatial and/or temporal filters with respective filter characteristics dependent on an image quality value,
wherein said image quality value is determined based on a user selection;
wherein the temporal filter operation decreases with an increasing image quality value;
wherein the temporal filter operation is realized with a blending filter applied to an entire frame which determines a new frame as a weighted sum of a predicted frame and an actual frame, which weighting is dependent on said image quality value and a difference of the actual frame with the predicted frame.

6. A device for picture processing, comprising:
spatial and/or temporal filters with respective filter characteristics dependent on an image quality value,
wherein said image quality value is determined based on a user selection;
wherein the temporal filter operation decreases with an increasing image quality value;
wherein the temporal filter operation is realized with a blending filter applied to an entire frame which determines a new frame as a weighted sum of a predicted frame and an actual frame, which weighting is dependent on said image quality value and a difference of the actual frame with the predicted frame;
wherein said predicted frame is determined on basis of a motion compensation of a previously determined new frame.

* * * * *

UNITED STATES PATENT AND TRADEMARK OFFICE
CERTIFICATE OF CORRECTION

PATENT NO. : 7,352,916 B2 Page 1 of 1
APPLICATION NO. : 11/202612
DATED : April 1, 2008
INVENTOR(S) : Estevez et al.

It is certified that error appears in the above-identified patent and that said Letters Patent is hereby corrected as shown below:

On the title page, Item (30), the Foreign Application Priority Data is missing. Item (30) should read as follows:

-- (30) Foreign Application Priority Data

Nov. 27, 2000 (EPO) ------------------------ 00 125 909 --

Signed and Sealed this

Twenty-fourth Day of June, 2008

JON W. DUDAS
*Director of the United States Patent and Trademark Office*